United States Patent
Li et al.

(10) Patent No.: US 7,241,338 B2
(45) Date of Patent: *Jul. 10, 2007

(54) SPRAYABLE, STRAIN-HARDENING CEMENTITIOUS COMPOSITIONS

(75) Inventors: Victor C. Li, Ann Arbor, MI (US); Yun Yong Kim, Daejeon (KR); Hyunjoon Kong, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/674,773

(22) Filed: Sep. 30, 2003

(65) Prior Publication Data

US 2005/0066858 A1 Mar. 31, 2005

(51) Int. Cl.
*C04B 16/06* (2006.01)

(52) U.S. Cl. ............... 106/692; 106/695; 106/724; 106/726; 106/737; 106/823

(58) Field of Classification Search ............... 106/692, 106/695, 724, 726, 737, 823
See application file for complete search history.

(56) References Cited

U.S. PATENT DOCUMENTS

| | | | |
|---|---|---|---|
| 4,057,528 A | | 11/1977 | Hunt |
| 4,266,889 A | * | 5/1981 | Rail et al. ............... 405/223 |
| 4,288,639 A | | 9/1981 | Camp |
| 4,316,807 A | * | 2/1982 | McDaniel et al. |
| 4,411,819 A | | 10/1983 | Panek et al. |
| 4,463,039 A | * | 7/1984 | O'Connell et al. ......... 427/421 |
| 4,504,602 A | * | 3/1985 | O'Connell et al. |
| 4,640,791 A | | 2/1987 | Deck et al. |
| 4,673,518 A | | 6/1987 | Owens et al. |
| 4,772,327 A | | 9/1988 | Allemann et al. |
| 4,842,650 A | * | 6/1989 | Blounts |
| 5,114,487 A | | 5/1992 | Gartshore et al. |
| 5,322,389 A | * | 6/1994 | Smith ............... 405/128 |
| 5,356,671 A | | 10/1994 | Drs |
| 5,413,819 A | | 5/1995 | Drs |
| 5,453,123 A | * | 9/1995 | Burge et al. ............. 106/708 |
| 5,560,774 A | * | 10/1996 | Burge et al. ............. 106/692 |
| 5,609,681 A | * | 3/1997 | Drs et al. ............... 106/802 |

(Continued)

FOREIGN PATENT DOCUMENTS

CN 1137051 * 12/2006

(Continued)

OTHER PUBLICATIONS

"Continuous automatic control of consistence of portland cement slurry" Tkachev, Tsement (1953), 19(No. 2), 8-14. (Abstract Only).*

(Continued)

*Primary Examiner*—Paul Marcantoni
(74) *Attorney, Agent, or Firm*—Brooks Kushman P.C.

(57) ABSTRACT

Sprayable fiber reinforced hydraulically setting mortars exhibit strain hardening behavior, and comprise hydraulically setting cement, less than 4 weight percent matrix interactive fibers, a non-Newtonian additive, a superplasticizer, optionally a viscosity control agent, aggregate, and further additives. The ductile composites can be prepared by spraying in thicknesses higher than conventional sprayable mortars.

24 Claims, 1 Drawing Sheet

U.S. PATENT DOCUMENTS

| | | | |
|---|---|---|---|
| 5,681,386 A * | 10/1997 | Tjugum | 106/819 |
| 5,961,712 A | 10/1999 | Sun et al. | |
| 5,993,537 A | 11/1999 | Trottier et al. | |
| 6,809,131 B2 * | 10/2004 | Li et al. | 524/5 |
| 6,824,607 B2 * | 11/2004 | Baeuml et al. | 106/802 |
| 2002/0019465 A1 * | 2/2002 | Li et al. | 524/2 |
| 2005/0068857 A1 * | 3/2005 | Li et al. | 106/672 |

FOREIGN PATENT DOCUMENTS

| | | | |
|---|---|---|---|
| DE | 2703342 | * | 8/1978 |
| DE | 2816457 | * | 11/1978 |
| DE | 19854476 | * | 5/2000 |
| DE | 19854477 | * | 5/2000 |
| JP | 2001220188 | * | 8/2001 |
| JP | 2002193653 | * | 7/2002 |
| WO | WO 2000047534 | * | 8/2000 |

OTHER PUBLICATIONS

"Experimental study of heat transfer to a cooling coil in an agitated vessel", Mizushina et al., Kagaku Kogaku (1966), 30(9), 827-33. (Abstract Only).*

"Effect of cement composition and other factors on the rheological behavior of cement mortars", □□Ivanov et al., Silicates Industries (1979), 44(9), 199-203. (Abstract Only).*

"Improved pressure drop/flow rate equation for non-Newtonian fluids in laminar flow", Aadnoy et al., Journal of Petroleum Science and Engineering (1994), 11(3), 262-6. (abstract only).*

"Rheology in the cement industry", Papadakis, Silicates Indus. (1957), 22, 612-15, 675-81. (Abstract only).*

"Studies on self hardening slurry", Part 2. Properteies before Hardening, Kita et al.,□□Obayashigumi Gijutsu Kenkyushoho (1980), 20, 71-6. (abstract only).*

Basics of paste backfill systems' Brackenbusch, Mining Engineering (Littleton Colorado, US), (1994), 46(10), 1175-8. (abstract only).□□*

"Quality test to prove the flow behavior of SCC on site", Buchenau et al., RILEM Proceedings (2003), PRO 33(Self Compacting Concrete), 84-93. (abstract only).*

"Defining the stability criterion of a sphere suspended in cement paste: a way to study the segregation risk in self compacting concrete (SCC)" Bethmont et al., RILEM Proceedings (2003), PRO 33 (Self Compacting Concrete), 94-105.*

Katz A., et al., "A Special Technique for Determining the Bond Strength of Carbon Fibers in Cement Matrix by Pullout Test," Journal of Materials Science Letters, 15, 1996, pp. 1821-23.

Melbye, T.A. et al., "Modern Advances and Applications of Sprayed Concrete," Schocrete: Engineering Developments, ed. E.S. Bernard, Swets & Zeitlinger B.V., pp. 7-29, 2001.

* cited by examiner

SPRAYABLE, STRAIN-HARDENING CEMENTITIOUS COMPOSITIONS

BACKGROUND OF THE INVENTION

1. Field of the Invention

The present invention pertains to sprayable, fiber-reinforced cementitious compositions which harden to form cementitious composites which exhibit strain hardening behavior.

2. Background Art

Sprayable cementitious compositions are known. Such compositions generally consist of a hydraulic cement such as Portland cement, a filler such as sand, water, and additives. The wet mortar is sprayed onto surfaces through a nozzle, to which it is conveyed by a pump, for example a spiral pump. Such conventional sprayable cement has noted disadvantages, however, in particular, substantially no ductility. In tension, only a very low percentage of strain can be tolerated before failure. Thus, such concrete is not suitable for applications where the concrete is expected to carry tensile loads, and even stresses caused by temperature changes can weaken the structure dramatically.

Sprayable cementitious materials, such as a concrete or mortar, can be defined as cementitious materials conveyed through a hose and pneumatically projected at high velocity from a nozzle into place. The rheological properties of the fresh mix in the wet spray processing are obviously crucial. The fresh mix should be moderately deformable, i.e., pumpable under the pumping and conveying pressure, so it will efficiently move through the hose to the nozzle. Once it is sprayed onto the surface of the substrates, however, it adhere to the substrate and remain cohesive without composite ingredient segregation.

Spray applications of fresh cementitious materials mix is regarded as beneficial for the repair of infrastructures such as bridges, culverts, underground structures, and other aged structures as well as for ground support such as a tunnel lining systems. Moreover wet process spray application has a number of advantages over cast, hand-applied, and dry spray processes, including the reduction or elimination of formwork, faster and more efficient construction, and reduction of environmental problems associated with heavy dust. For success of remedial work or ground support construction, the ductile performance of hardened cementitious materials is of great importance since many infrastructure deterioration problems and failures can be traced back to the cracking and brittle nature of cementitious materials. However, as indicated previously, conventional sprayable concrete or mortar lacks ductility.

In FIG. 1, the difference between brittle, quasi-brittle, and strain-hardening (ductile) behavior under uniaxial tensile load is portrayed schematically. In all three, tensile stress initially increases rapidly with strain, as shown in portion 1 of the portrayal. For brittle materials, catastrophic failure occurs, at relatively low strain, as shown by portion 2 of the Figure. In quasi-brittle behavior, a rapid decrease in stress with increasing strain also occurs, but limited and decreasing tensile strength is maintained for some period of increasing deformation (3). This deformation is localized in the form of a crack opening. In strain-hardening behavior, above a certain condition of stress/strain, tensile strength increases with increasing strain (4). Ultimately, failure will also occur, but at a much higher value of strain.

While the fracture toughness of sprayable concrete or mortar is significantly improved by fiber reinforcement, most fiber-reinforced sprayable concrete or mortar still exhibits quasi-brittle post-peak tension-softening behavior under tensile load where the load decreases with the increase of crack opening. The tensile strain capacity therefore remains low, about the same as that of normal concrete, i.e. about 0.01%. Significant efforts have been made to convert this quasi-brittle behavior of fiber reinforced concrete to ductile strain-hardening behavior resembling ductile metal. In most instances, the approach is to increase the volume fraction of fiber as much as possible. As the fiber content exceeds a certain value, typically 4–10% depending on fiber type and interfacial properties, conventional fiber reinforced concrete may exhibit moderate strain-hardening behavior. High volume fraction of fiber, however, results in considerable workability problem. Fiber dispersion becomes difficult because of high viscosity of the mix due to the presence of high surface area of the fibers and the mechanical interaction between the fibers, along with the difficulties in handling and placing. Moreover, the fibers in sprayable fiber reinforced concrete act as obstacles during conveyance through the pump and hose, resulting in excess pumping pressure. Thus, the fiber volume fraction is limited not only by workability considerations but also by pumpability considerations. While continuous fibers have been used in concrete to attain strain-hardening, the fabrication techniques utilized are totally incompatible with spray processing.

U.S. Pat. No. 4,057,528 discloses non-air-entraining mixes comprising Portland cement and a styrene-butadiene polymer. Considerable improvement in compressive strength is obtained. However, elongation at break is low and no strain-hardening behavior is disclosed.

U.S. Pat. No. 4,772,327 discloses sprayable concrete wherein sprayability is enhanced by incorporation of naphthalene sulfonate/formaldehyde condensates, setting of which may be accelerated by addition of alkali silicates or highly dispersed silica. The concrete is stated to exhibit superior adhesion to surfaces, but no indication of any improved strength properties or tensile ductility are disclosed.

U.S. Pat. No. 5,114,487 discloses sprayable concrete prepared from Portland cement, a ground sulfoaluminous clinker, calcium sulfate, aggregate, and small quantities of stainless steel fibers. The concrete is suitable for coating welds on sections of concrete-coated steel piping for transport of oil from off-shore oil platforms. The compositions are resistant to impact damage, but there is no disclosure of strength properties or tensile ductility.

U.S. Pat. No. 5,356,671 discloses sprayable compositions which include micro-silica pretreated with selected liquids to improve rebound properties of sprayed cement, particularly dry sprayed cement. Neither strength properties nor tensile ductility are discussed.

U.S. Pat. No. 5,413,819 discloses the use of phosphoric acid derivatives as stabilizers or "retarders" for use in sprayable cement compositions. No use of fiber reinforcement is disclosed, nor are any strength properties or tensile ductility discussed.

U.S. Pat. No. 5,609,681 discloses sprayable concrete to which polyoxyalkylene and β-naphthalene sulfonate-formaldehyde condensates are added as slump modifiers. No fibrous reinforcement is employed, and strength properties and tensile ductility are not disclosed.

U.S. Pat. No. 5,681,386 discloses sprayable two-component concrete mixes where a first reactive additive is added to the base concrete mix, optionally with steel and polypropylene fibers, and a second reactive component is mixed in at the point of spraying. The concrete remains pumpable and sprayable due to keeping the additives initially separate, but allowing them to react independent of the concrete mass. The process is complex, and no improvements in strength properties or tensile ductility are disclosed.

U.S. Pat. No. 5,961,712 discloses complex concrete mixtures which are suitable for spraying, and offer rapid setting and high early compressive strength. The mixtures contain gypsum and high aluminous content, preferably ground sulfo-aluminate clinker. The compositions are stated to provide properties similar to Portland cement-based compositions while offering decreased rebound. No mention of tensile ductility is made.

U.S. Pat. No. 5,993,537 discloses use of special polypropylene copolymer fibers which fibrillate during admixture to concrete mixes to provide concrete with enhanced impact resistance and flexural strength. However, improvement in uniaxial tensile strength or tensile ductility are not disclosed.

SUMMARY OF THE INVENTION

Accordingly, the present invention provides a method of making a sprayable fiber-reinforced cementitious composite from sprayable mortars having enhanced pumpability and rebound property, and having substantially improved tensile strain capacity with strain hardening behavior, substantially improved flexural deformation capacity, and improved tensile strength, wherein hydraulic cement, water, non-Newtonian additive, viscosity agent, superplasticizer, and short discontinuous fiber are mixed to form a mixture having reinforcing fiber uniformly dispersed and having theological properties suitable for pumping and spraying. The mixture is then sprayed onto a substrate and cured to form a composite.

DETAILED DESCRIPTION OF THE PREFERRED EMBODIMENT(S)

Figure 1:
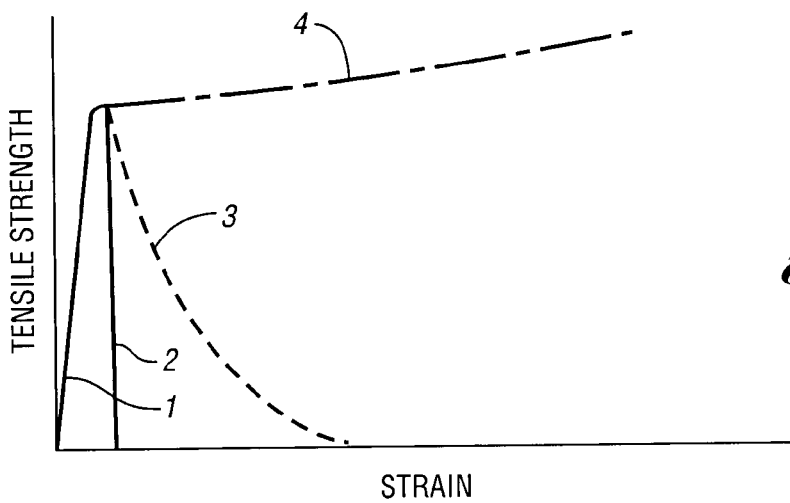
FIG. 1 illustrates graphically the difference between brittle, quasi-brittle, and strain hardening behavior of cementitious compositions.

An object of the invention is to provide sprayable fiber-reinforced cementitious products having substantially improved tensile strain capacity with strain hardening behavior, substantially improved flexural deformation capacity and improved tensile strength, compared with the respective properties of the other sprayable concrete or fiber reinforced concretes. This sprayed material substantially exhibits significant multiple cracking when stressed in tension with at least 1% tensile strain.

Another object of the invention is to provide a highly ductile cementitious material capable of being pneumatically sprayed for structural applications. The fresh material should exhibit characteristics necessary for spray processing, including desirable pumpability and adhesiveness to the desired substrates, such as overhead surfaces and vertical walls, and enhanced rebound properties. A measure of the fresh mix property performance is the thickness of the sprayed layer buildup which can be produced without dripping or sagging, especially in overhead sprays.

In a preferred embodiment of the invention, the cement preferably comprises a hydraulic cement, such as Type I Portland cement, and calcium aluminate cement. The weight ratio of water to cement is preferably within the range of 0.2 to 0.6. The discontinuous reinforcing fiber is preferably polyvinyl alcohol with a diameter within the range of 30–60 μm, preferably present from about 1.5% to 3.0% by volume of the composite. The viscosity agent is preferably selected from cellulose-derived polymers and polyvinyl alcohol.

In its broadest form, the sprayable concrete of the present invention includes a hydraulically setting cement, preferably a Portland cement, a non-Newtonian additive, optionally but preferably a viscosity control agent, a superplasticizer, and from about 0.1 to less than 4% matrix-interactive fibers. Conventional additives such as aggregate, accelerators, retarders, adhesion enhancers, consistency aids, and the like may all be added as well.

The hydraulically setting cement may be any type conventionally used, including Portland cement, blended Portland cement, rapid setting and hardening cement, expanding cement, pozzolanic cement, and mixtures thereof. The preferred hydraulically setting cement is Portland cement, preferably Portland Type I cement.

The non-Newtonian additive is a shear sensitive additive which causes the fresh mix to have a relatively low viscosity during pumping and spraying, both relatively high shear conditions, and considerably enhanced viscosity at low shear. The high shear viscosity is preferably the same or modestly elevated with respect to the viscosity of the mix without the non-Newtonian additive. The non-Newtonian additive may be inorganic, or may be an organic polymer.

A preferred inorganic non-Newtonian additive comprises calcium aluminate cement. While calcium aluminate cement is also hydraulically setting, it is not included in the definition of "hydraulically setting cements" herein to distinguish it from the latter.

Examples of non-Newtonian polymers are, in particular, associative thickeners with relatively large hydrophobes. An associative thickener is a polymer having a relatively polar and/or hydrophilic portion, and at least one, preferably two or more hydrophobic portions. In aqueous and polar environments, such thickeners tend to associate through hydrophobe:hydrophobe interactions to produce associated molecules of much higher molecular weight, thus acting in the manner of very high molecular weight viscosifiers. However, because the association between hydrophobes is largely due to relatively weak forces, the polymer molecules disassociate under shear, and thus considerably reduce the viscosity of compositions of which they are a part.

Preferred polymer non-Newtonian additives include polymers such as block poly(ethylene/vinyl alcohol) copolymers having two or more terminal polyethylene blocks, and poly(meth)acrylic acid copolymers having terminal blocks of hydrophobic polymers such as polystyrene, polyethylene, polypropylene, higher alkyl acrylates, $C_{6-20}$ vinyl esters, and the like. Preferred non-Newtonian additives include polyoxyalkylene block polyethers having an internal block of polyoxyethylene or randomly copolymerized ethylene oxide and propylene oxide moieties, and external (terminal) hydrophobes prepared by oxyalkylating with a higher alkylene oxide, preferably a $C_8$–$C_{30}$ α-olefin oxide, or by esterifying hydroxyl end groups of the internal hydrophile with a long chain fatty acid such as a $C_{10-30}$ fatty acid. Shear thinning behavior is most pronounced when the length of the hydrocarbon moiety in the hydrophobe increases. Preferred hydrocarbon chain lengths are $C_{12-30}$, preferably $C_{15-30}$. Examples of polyether non-Newtonian additives are given in U.S. Pat. Nos. 4,411,819, 4,288,639, 4,640,791, and 4,673,518 which are herein incorporated by reference. Organic non-Newtonian additives may be used in conjunction with inorganic non-Newtonian additives.

Organic non-Newtonian additives, when used, are preferably used in amounts of from 0.1 to about 10 weight percent based on the weight of the cement fraction, more preferably 0.1 to about 5 weight percent, and most preferably 0.1 weight percent to 2 weight percent. The amount will generally vary inversely with the low shear viscosity achievable at a given concentration.

The hydraulically setting cement and calcium aluminate cement, when the latter is used, together comprise the "cement fraction" of the sprayable concrete. Of this cement fraction, from about 1 weight percent to about 20 weight percent, preferably 2.5 weight percent to 15 weight percent, and most preferably from 3.5 to 8 weight percent is calcium aluminate. The balance of the cement fraction is the hydraulically setting cement. It has been found that calcium aluminate cement is an ingredient which provides a mix suitable for spraying on both vertical and horizontal surfaces, and which provides increased working life, in particular a mix which is highly reversible under pressure, and yet one which sets rapidly. Use of hydraulically setting inorganic non-Newtonian additives has the advantage that a greater proportion of the mix contributes to the strength of the cured composite.

A viscosity control agent is generally necessary. Conventional viscosity control agents are useful, including in particular, cellulose derivatives such as methyl cellulose, hydroxyethyl cellulose, hydroxypropyl cellulose, carboxymethyl cellulose, and the like. Other viscosity control agents such as polyvinylalcohol and a variety of acrylate polymers are all useful, and well known to those skilled in the art. The viscosity control agent is provided in an effective amount when used, for example an amount of from 0.1 weight percent to about 5 weight percent, more preferably 0.2 weight percent to 3 weight percent, and most preferably from about 0.5 weight percent to about 1.5 weight percent. The amount used is related inversely to the viscosifying effect of the viscosity agent. The viscosity agent enhances the ability of the concrete to be sprayed onto vertical and horizontal surfaces. Without the viscosity control agent, only limited thickness of concrete could be applied to vertical surfaces, and practically none to horizontal overhead surfaces. However, the amount must not be such that the viscosity of the mix is too high for pumping or spraying.

A superplasticizer is also required. The superplasticizer reduces the amount of water which needs to be added to the mix, while maintaining pumpability and sprayability. Any superplasticizer is suitable, and many are disclosed in the patents previously cited. Preferred superplasticizers include sulfonated melamine/formaldehyde condensates, and carboxylic acid-functional polymers and copolymers such as polyacrylic acid, polymaleic acid, acrylic acid and maleic acid copolymers, and copolymers of unsaturated mono- and dicarboxylic acids and/or maleic anhydride with other copolymerizable unsaturated monomers such as olefins, styrene, vinyl esters, acrylate esters, and the like. The superplasticizer is added in an amount effective to achieve pumpability and sprayability at the water content utilized, preferably from 0.1 weight percent to about 10 weight percent, more preferably from 0.3 weight percent to 5 weight percent, and most preferably from 0.5 weight percent to 2 weight percent.

Matrix interactive fibers are a necessary component of the sprayable concrete, and are present in an amount necessary to produce strain hardening behavior, preferably in amounts of from about 0.1 to less than 4 volume percent, more preferably 0.5 to 3.5 volume percent, yet more preferably 0.7 to 3.0 volume percent, and most preferably 1.5 to 2.5 volume percent. The upper limit of fiber concentration is dictated by pumpability and sprayability requirements, while the lower limit is dictated by the ability to provide strain hardening (ductile) behavior as opposed to brittle or quasi-brittle behavior.

The fibers must be of specific diameter and be relatively strongly matrix interactive, although additional fibers which are not matrix interactive to any sufficient degree may be included as well. The matrix interactivity may be measured by single fiber pullout tests as disclosed in A Katz et al. "A Special Technique for Determining the Bond Strength of Carbon Fibers in Cement Matrix by Pullout Test," JOURNAL OF MATERIALS SCIENCE LETTERS, 15, 1996 pp. 1821–23. The fibers should exhibit interfacial chemical bonding less than about 4.0 $J/m^2$, more preferably less than 2.5 $J/m^2$, and, depending upon the interface frictional stress, preferably greater than 0.1 $J/m^2$, more preferably greater than 0.3 $J/m^2$. If the interfacial chemical bonding or "interaction" is too high, the fibers will resist pullout from the matrix as strain increases until the fibers rupture, resulting in catastrophic failure. On the other hand, if the interaction is too little, the fibers will be easily pulled from the matrix, and strain hardening will not be achievable.

The fibers must also be relatively strong, preferably exhibiting a strength of 800 MPa or more, a modulus of elasticity from 10 to 300 GPa, more preferably 40–200 GPa, interface frictional stress between 0.5 to 3.0 Mpa and more preferably 0.8 to 2.0 Mpa, and an interface slip hardening coefficient below 3.0 and preferably below 1.5, the latter properties also measured by the single fiber pullout test.

The fiber length is at least about 4 mm, and limited on the high side to that which still provides a pumpable and sprayable composition. Mixtures of different fiber lengths are useful, for example a major quantity of relatively short fibers, and a minor quantity of longer fibers, e.g. less than 30 volume percent of total fiber. The preferred fiber lengths are between 4 and 30 mm, more preferably between 6 mm and 20 mm, and most preferably in the range of 6 mm to 15 mm. The fiber diameter is preferably from 10 μm to 150 μm, more preferably between 20 μm and 100 μm, and most preferably from 30 μm to 60 μm.

The fibers are preferably polyarylamide, high modulus polyethylene, or polyvinylalcohol. Polypropylene fibers are not suitable, nor are carbon fibers, cellulose fibers, low density polyethylene fibers, or steel (including stainless steel) fibers. Such fibers have been found not to produce strain hardening behavior, although they may be used in conjunction with fibers which meet the criteria discussed above. A particularly preferred fiber is K-II REC™, an oiled polyvinylalcohol fiber available from Kuraray Co., Ltd., Japan, which exhibits an average diameter of 30 μm, an average length of 8 mm, a nominal strength of 1,620 Mpa, an elongation at break of 6%, a Young's modulus of 42.8 Gpa, and an oiling agent content of 0.8%. The oiling agent is necessary with this polyvinylalcohol fiber to lower the fiber interaction with the matrix to within the ranges previously discussed. Polyvinyl alcohol fibers can exhibit strong matrix interactions.

The sprayable mixtures generally contain aggregate such as sand, ground stone, etc., in amounts preferably up to 200 weight percent relative to the weight of the cement fraction. Lightweight aggregate may also be included. Light weight aggregate includes not only solid particles of low density such as fly ash, expanded mica, and glass, ceramic, and polymer microballoons and the like, but also includes trapped gas bubbles (foam). Incorporation of light weight aggregates decreases the density of the aqueous mix, and also allows increased thicknesses to be sprayed, particularly on horizontal overhead surfaces. If the amount of light weight aggregate is significant, then the particle size becomes important, otherwise strain hardening cannot be achieved. In general, the mean size, as determined by the Sieve Analysis Test according to ASTM C 125 is preferably between 10 µm 1000 µm, more preferably between 10 µm and 500 µm, and most preferably between 10 µm and 100 µm.

The lightweight aggregate may be those such as have previously been used to produce lightweight concrete, but in the range of particle sizes previously stated. The particle sizes are measured by sieve analysis per ASTM C 125.

The lightweight "aggregate" may also comprise gas bubbles, all or in part. The gas may be introduced during processing of the hydraulically settable mixture by physical means, i.e. frothing or aeration, or may be chemically induced, for example hydrogen gas by reaction of aluminum powder with the alkaline composition, or through the use of Si—H functional silanes which liberate hydrogen by reaction with water under these conditions. If gas bubbles are used as the sole lightweight aggregate, it is preferred that stabilizing substances be added to assist in preventing coalescence of adjoining bubbles, or that the volume percent be limited so as to provide a cured density of about 1400 Kg/M$^3$ or higher, preferably 1500 Kg/m$^3$ or higher. If significant coalescence to large voids occurs, strength properties of the composite, particularly strain hardening behavior, will be compromised. Gas bubbles are particularly useful when used in conjunction with other lightweight aggregates. In such formulations, the volume fraction of gas bubbles can be kept small so that coalescence will be minimal. For example, in a composite with a target density of 1300 Kg/m$^3$, enough gas or gas precursor may be added so as to result in a density of about 1600 Kg/m$^3$ or higher if used alone, and enough other lightweight filler added to lower the density to the target range.

The ingredients are mixed with water separately, or in the form of one or more premixes, in conventional mixers. However, the calcium aluminate, when used, is preferably added last, or towards the end of total additions. The viscosity agent, superplasticizer and optionally other components may be added in the form of an aqueous solution or dispersion, e.g. one with a solids content of 20–50 weight percent, more preferably about 30–35 weight percent. The total amount of water is such that the concrete remains pumpable and sprayable, and also results in a composition which is capable of spraying to the desired thickness. In general, more water reduces the viscosity and increases sprayability, while less water increases cohesion and allows for thicker applications. The water to cement fraction ratio is preferably between 0.2:1 to 0.6:1, more preferably 0.3:1 to 0.55:1, and most preferably in the range of 0.4:1 to 0.55:1. Greater amounts of superplasticizer generally lower the amount of water which can be used successfully.

A preferred mixing order comprises the steps of 1) mixing dry powders including cement (except of calcium aluminate cement), sand, and fly ash; 2) mixing of the components above with water for several minutes; 3) adding superplasticizer aqueous solution (33.3 wt %) to disperse the particles and mixing for several minutes; 4) adding polymer fibers, such as PVA fibers into the fresh cementitious mix and mixing for several minutes; 5) adding hydroxypropylmethyl cellulose into the fresh mix and mixing for several minutes; and 6) adding calcium aluminate cement into the fresh mix and mixing for several minutes. Polymeric non-Newtonian additives are preferably added with the water, or at any stage following water addition.

Having generally described this invention, a further understanding can be obtained by reference to certain specific examples which are provided herein for purposes of illustration only and are not intended to be limiting unless otherwise specified.

EXAMPLE 1

The exemplary mix set forth below for preparing sprayable composites, comprises cement, water, sand, fly ash, viscosity agent, superplasticizer, and discontinuous short fibers. The non-Newtonian additive is the preferred calcium aluminate cement. A specific example of a weight-based composition of a sprayable strain hardening cement is as follows:

TABLE 1

| C | | | | | | | Fiber |
|---|---|---|---|---|---|---|---|
| PC1/C | CA/C | W/C | S/C | FA/C | VA/C | SP/C | (Vol %) |
| 0.95 | 0.05 | 0.46 | 0.80 | 0.30 | 0.0005 | 0.0075 | 2.00 |

(C: cement; PC1: Type I Portland cement; CA: calcium aluminate cement; W: water; S: sand; FA: fly ash; VA: viscosity agent; and SP: superplasticizer)

The cements used are Type I Portland cement from Lafarge Cement Co., MI, USA and calcium aluminate cement available as CA-25C from Alcoa World Chemicals Co., USA. Fine sand with a size distribution from 50 to 150 µm, available as F110 through US Silica Co., MN, USA, is used for sand. Fly ash used is class F fly ash with a size distribution from 10 to 100 µm from Boral Material Technologies Inc., TX, USA. The viscosity agent used is hydroxypropyl methylcellulose, available as Methocel™ cellulose ethers through Dow Chemical Co., MI, USA. A superplasticizer available as Melment™ 330 from W. R. Grace & Co., IL, USA is used. K-II REC™ PVA fiber available through Kuraray Co. Ltd. of Osaka, Japan, is used in the exemplary mix at 2% volume fraction.

For the preparation of the fresh sprayable mix, fly ash and sand were mixed in a drum mixer. Water and Type I Portland cement were added to form the basic mortar matrix. An aqueous solution of superplasticizer was added prior to the addition of PVA fibers in order to ensure a uniform dispersion of cementitious particles and fibers. In the last step, HPMC and calcium aluminate cement were added manually to prevent segregation in the fresh mix and to achieve a controlled cohesion process, respectively.

EXAMPLE 2 AND COMPARATIVE EXAMPLES C1, C2

An N2V (PFT Gmbh & Co. KG, Iphofen, Germany) spiral pump was used for spraying in the examples. This system was known to be particularly suitable for premixed liquids and mortar with the maximum grain size of 3 mm. Sprayable mortar mixed in a drum mixer was pumped through this spiral pump and then down a 25 mm diameter rubber hose to a spray gun, from where it was sprayed pneumatically with an air pressure of approximately 700 Kpa onto a substrate. The maximum sprayable thickness on horizontal (overhead) and vertical surfaces were noted in addition to the pumping pressure. The results are presented in Table 2.

TABLE 2

| Spray material | Pumping pressure (Mpa) | Maximum achievable thickness of sprayed layer | |
| --- | --- | --- | --- |
| | | Vertical Surface | Overhead Surface |
| Example 1 | <1.0 | 45 mm | 25 mm |
| PM-1 | 2.0 | 10 mm | — |
| PM-2 | >4.0 | — | — |

Mortars were sprayed in wood molds positioned vertically during spraying. Two panels (a) and (b) were sprayed for the determination of tensile and flexural performances. Sprayed panels were demolded one day after spraying, and then cured in air. As a reference material for the sprayable strain hardening cementitious composites of the present invention, two kinds of commercially available spray mortars (PM-1, PM-2) were also sprayed into the same molds that were used for spraying the panels with the subject invention mortar. PM panels were cured in moisture condition according to the instruction of manufacturers. All the panels were sawn into test specimens approximately 5 days after spraying.

As displayed in the Table, no excess pumping pressure (the maximum value permitted by manufacturer: 4 Mpa) was observed during the spray process. Moderate pumping pressure (2 Mpa) was also observed during the test on PM-1. However, the pumping test on PM-2, in which 25 mm length of synthetic fibers with volume content of less than 0.5%, was interrupted because the pumping pressure reached the maximum value (4 Mpa) and kept going up. It strongly demonstrates that the sprayable strain hardening cementitious composites of the present invention exhibit better pumpability despite the presence of fibers (2 vol %).

To realize the applications of the present invention to construction or repair work, the fresh mix should be adaptable for spraying onto vertical or overhead surfaces, as for example, construction of tunnel lining, and repair to bridge deck undersides and pier support surfaces. The fresh mix was sprayed horizontally onto a vertical surface and vertically onto an overhead surface to try and obtain as large a thickness of sprayed concrete as possible. Spraying onto a vertical surface, a maximum thickness 45 mm was obtained, which is estimated to be around 4.5 times the thickness of the commercial spray mortars (10 mm). Spraying onto an overhead surface, the maximum thickness of 25 mm was achieved. If the thickness of sprayed layer exceeds the maximum thickness, the sprayed layer will flow down or sag down due to its dead weight exceeding the internal cohesion force or the adhesion force to the substrate. It is preferable that the subject compositions are able to produce layer thicknesses of in excess of 10 mm, preferably in excess of 15 mm, more preferably in excess of 20 mm on overhead surfaces.

It was particularly noted that very low rebounds were observed in spraying the subject invention mixes. In contrast, the sands, aggregates and steel fibers are extensively rebounded from the substrate, when conventional PM and fiber reinforced concrete are sprayed. Melbye, T. A., and Holmgren, J., "Modern Advances and Applications of Sprayed Concrete," in SHOCRETE: ENGINEERING DEVELOPMENTS, ed. E. S. Bernard, Swets & Zeitlinger B. V., pp. 7–29, 2001. This behavior is most likely because all ingredients in the subject invention mortars are strongly integrated in the viscous cement suspensions due to the smaller size of sand and lower stiffness of the fiber, compared to PMs or typical steel fiber reinforced shotcrete ("SFRS"). Such a lower rebound may have highly beneficial effects on construction cost and mechanical performance. First, the amount of rebound typically demands an additional 5 to 8% increase in sprayed concrete cost per $m^3$. It is clear that the lower rebound characteristics of the subject invention sprayable mortars can reduce the extra cost significantly. Second, it is generally agreed that the amount of fiber rebound seriously affects the toughness of the resulting in-situ SFRS. Highly toughened spray cementitious material can be obtained by the use of the subject invention strain hardening mortar in wet spray process.

The fresh mortar mix was highly reversible under pressure, allowing the time between the mixing and spray process to be extended. In addition, it was possible to collect the fresh materials sprayed onto the surface and re-spray it. This good reversibility is highly advantageous on ensuring the flexibility upon the spray process, and is very different from conventional spray cementitious materials, which should be sprayed right after an addition of setting accelerants. In addition, conventional materials cannot be re-used, once they are sprayed.

Test Results

Uniaxial tensile tests were conducted to characterize the tensile behavior of the sprayed composite materials. Since some quasi-brittle fiber reinforced concretes show "apparent" strain-hardening behavior under flexural loading, direct uniaxial tensile test is considered the best way to confirm strain-hardening behavior of the composite. The coupon sawn from the sprayed panel measures 305 mm×76 mm×13 mm. Aluminum plates were glued to the coupon specimen ends to facilitate gripping. Tests were conducted in an MTS machine with 25 KN capacity under displacement control. The loading rate is 0.15 mm/min. throughout the test. Two external LVDTs (Linear Variable Displacement Transducer) were attached to the specimen surface with a gage length of about 180 mm to measure the displacement. After tensile tests, crack widths were measured with a Micro Watcher (Olympus, Japan) at 200× magnification. The flexural tests were carried out at 28 days under four point bending in the same MTS testing machine, the specimens were loaded to complete failure with a constant cross head speed (0.3 mm/sec). The load and deflection of the beams at the midpoint were recorded in each test. Beams of 76×51 mm cross section and 356 mm length sawn from sprayed panels were employed.

Figure 2:
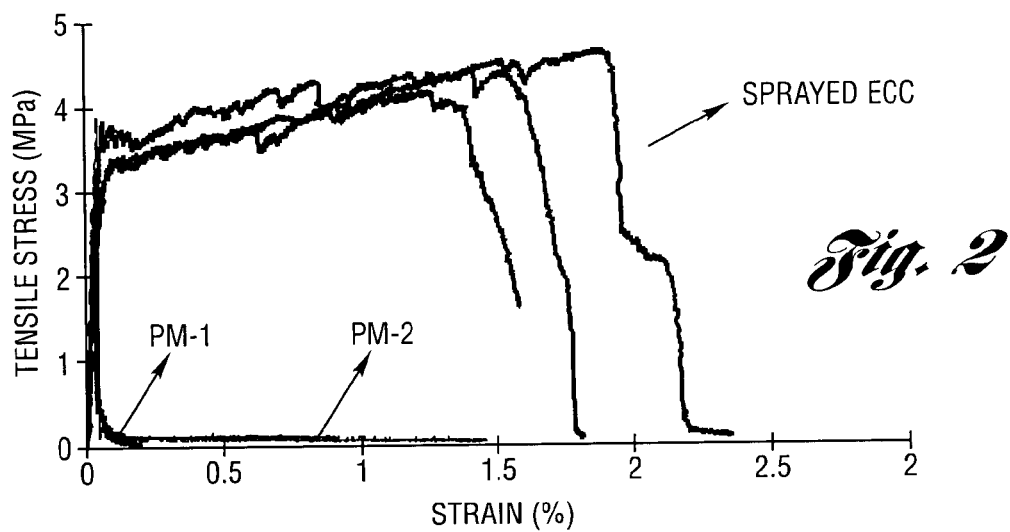
FIG. 2 illustrates strain hardening in test coupons prepared from the composition of Example 1 as compared to the brittle or quasi-brittle nature of commercial fiber-reinforced mortar.

FIG. 2 illustrates the measured tensile stress-strain curves. All specimens of the subject invention show strain hardening behavior with strain capacities from 1.5 to nearly 2.3%, which are estimated to be more than 50 times of the ductility of PMs (0.03%). The average first crack strengths vary from 3.0 to 3.5 Mpa, which are much higher than the tensile strengths of PMs. After first cracking, the load continues to rise, developing multiple cracks subsequently, which contribute to the inelastic strain as stress increases. The large number of microcracks have very fine crack spacing and small average crack width (30 μm). In contrast, a single crack that continuously opens while stress decreases was observed in PMs. After the peak stress is reached, the localized crack leads to the brittle failure of the composites, although PM-2 shows a longer tail compared to PM-1 due to the pull-out mechanism of fibers at the localized crack.

Figure 3:
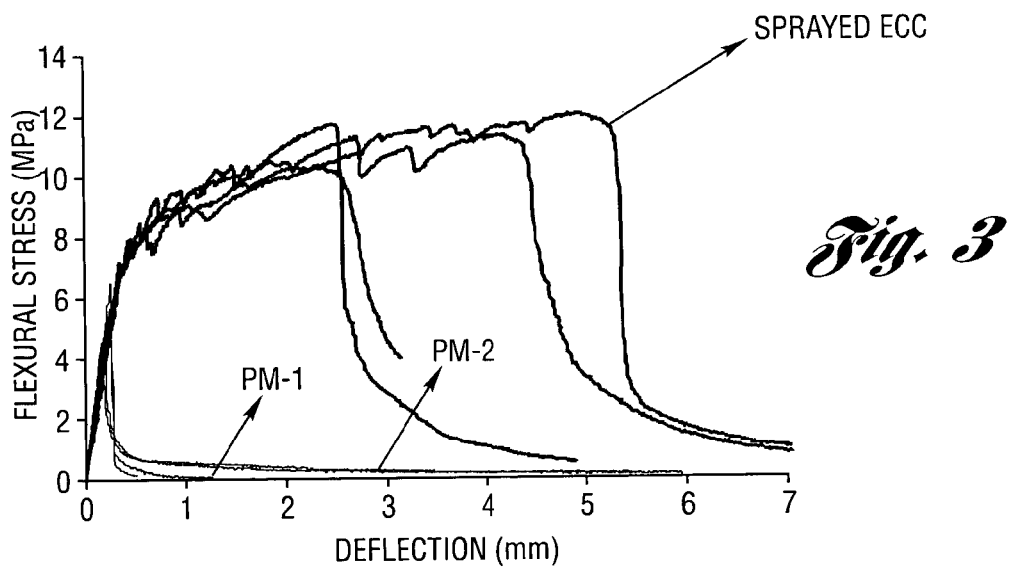
FIG. 3 illustrates flexural stress versus deflection curves for the compositions of FIG. 2.

FIG. 3 shows the measured flexural stress-deflection curves. The flexural stress represents the maximum stress at the bottom face of the beams. The average ultimate deflection of sprayed beams of the subject invention at the peak stress was achieved to be as much as 3.65 mm within the error range. It is much higher than the flexural deformation capacity of PMs (0.22±0.04 mm). The flexural strength for the sprayed subject invention composites was determined to be 11.12 Mpa, which is about double the flexural strength of PMs (4–6 Mpa). Although flexural toughness has not been measured for the subject invention composites, it is expected to be much higher than that of conventional sprayed concrete and fiber reinforced concrete based on the area under flexural stress-deflection diagrams.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A pumpable and sprayable, fiber-reinforced, strain hardening hydraulically settable mortar comprising
    a) at least one of portland cement or pozzolanic cement,
    b) a strain hardening amount of matrix-interactive reinforcing fibers within the range of 0.1 to less than 4.0 volume percent relative to the volume of the mortar, said matrix interactive reinforcing fibers having a length of from about 4 mm to about 30 mm, a fiber diameter between 10 µm and 150 µm, a modulus of elasticity between 10 GPa and 300 GPa, an interface frictional stress between 0.5 and 3.0 MPa, and interfacial chemical bonding between 0.1 $J/m^2$ and 4.0 $J/m^2$;
    c) at least one non-Newtonian additive selected from the group consisting of calcium aluminate cement and organic non-Newtonian associative thickeners, such that the mortar viscosity during pumping and spraying is lower than the viscosity at low shear:
    d) water in a weight ratio of 0.2:1 to 0.6:1 based on the weight of the hydraulically settable cement fraction;
    e) a superplasticizer in an amount of 0.1 weight percent to about 10 weight percent based on the weight of the sprayable and pumpable mortar;
    f) a viscosity control agent in an amount of from 0.1 weight percent to about 5 weight percent based on the weight of the pumpable and sprayable mortar.

2. The pumpable and sprayable mortar of claim 1, wherein said non-Newtonian additive consists of calcium aluminate cement.

3. The pumpable and sprayable mortar of claim 1, wherein said hydraulically settable cement consists essentially of Portland Type I cement.

4. The pumpable and sprayable mortar of claim 1 wherein said non-Newtonian additive is an associative thickener which is a polyoxyalkylene block copolymer having an internal hydrophilic block containing polymerized ethylene oxide and optionally randomly copolymerized propylene oxide, and terminal hydrophobes.

5. The pumpable and sprayable mortar of claim 1, wherein said viscosity control agent is selected from the group consisting of cellulose derivatives, polyvinylalcohol, acrylate polymers, and mixtures thereof.

6. The pumpable, sprayable mortar of claim 1, wherein said matrix interactive reinforcing fibers are oiled polyvinylalcohol fibers.

7. The pumpable, sprayable mortar of claim 1, which contains calcium aluminate cement as the non-Newtonian additive, and a cellulose derivative as the viscosity control agent.

8. The pumpable and sprayable mortar of claim 1, wherein said reinforcing fibers are present in an amount of 0.7 to 3.0 volume percent.

9. The pumpable and sprayable mortar of claim 1, wherein said reinforcing fibers are present in an amount of 1.5 to 2.5 volume percent.

10. The pumpable and sprayable mortar of claim 1 which, when cured, exhibits a strain of at least 0.5% prior to failure.

11. The pumpable and sprayable mortar of claim 1 which, when cured, exhibits a strain of at least 1.0% prior to failure.

12. The pumpable and sprayable mortar of claim 1 which, when cured, exhibits a strain of at least 1.5% prior to failure.

13. The pumpable and sprayable mortar of claim 1 wherein the reinforcing fibers have a modulus of elasticity of from 10 to 300 GPa.

14. The pumpable and sprayable mortar of claim 1, wherein said reinforcing fibers have a strength of 800 mPa or more.

15. The pumpable and sprayable mortar of claim 1, wherein said superplasticizer is present in an amount of from 0.3 weight percent to 5 weight percent based on the weight of the sprayable mortar.

16. The pumpable and sprayable mortar of claim 1, wherein said viscosity control agent consists essentially of one or more cellulose derivatives selected from the group consisting of methyl cellulose, hydroxyethylcellulose, hydroxypropylcellulose, and carboxymethyl cellulose, the total amount of cellulose derivatives being from 0.1 weight percent to about 5 weight percent based on the total weight of sprayable mortar.

17. The pumpable and sprayable mortar of claim 1, further comprising aggregate in an amount up to 200 weight percent relative to the weight of the remaining mortar components.

18. The pumpable and sprayable mortar of claim 17, wherein the aggregate consists of sand or ground stone.

19. The pumpable and sprayable mortar of claim 3, wherein at least a portion of said aggregate is a light weight aggregate having a mean particle size according to ASTM C125 of between 10 µm and 1000 µm.

20. The pumpable and sprayable mortar of claim 1 which, when sprayed on an overhead horizontal surface, is able to produce at least a 10 mm thick single layer without dripping or sagging.

21. The pumpable and spray able mortar of claim 1 which, when sprayed on an overhead horizontal surface, is able to produce at least a 20 mm thick single layer without dripping or sagging.

22. The pumpable and sprayable mortar of claim 1, wherein the superplasticizer is present in an amount of 0.3 weight percent to 5 weight percent.

23. The pumpable and sprayable mortar of claim 1, wherein calcium aluminate cement is present in an amount of 2.5 to 15 weight percent based on the total of calcium aluminate cement, and the portland cement and pozzolanic cement of component a).

24. The pumpable and sprayable mortar of claim 1, wherein calcium aluminate cement is present in an amount of 3.5 to 8 weight percent based on the total of calcium aluminate cement, and the portland cement and pozzolanic cement of component a).

* * * * *

UNITED STATES PATENT AND TRADEMARK OFFICE
CERTIFICATE OF CORRECTION

PATENT NO. : 7,241,338 B2  Page 1 of 1
APPLICATION NO. : 10/674773
DATED : July 10, 2007
INVENTOR(S) : Victor C. Li et al.

It is certified that error appears in the above-identified patent and that said Letters Patent is hereby corrected as shown below:

Column 12, Line 48, Claim 21:

Delete "spray able" and insert therefor -- sprayable --.

Signed and Sealed this

Sixth Day of November, 2007

JON W. DUDAS
*Director of the United States Patent and Trademark Office*